Figures 1, 2, 3, 4, 5, 6:
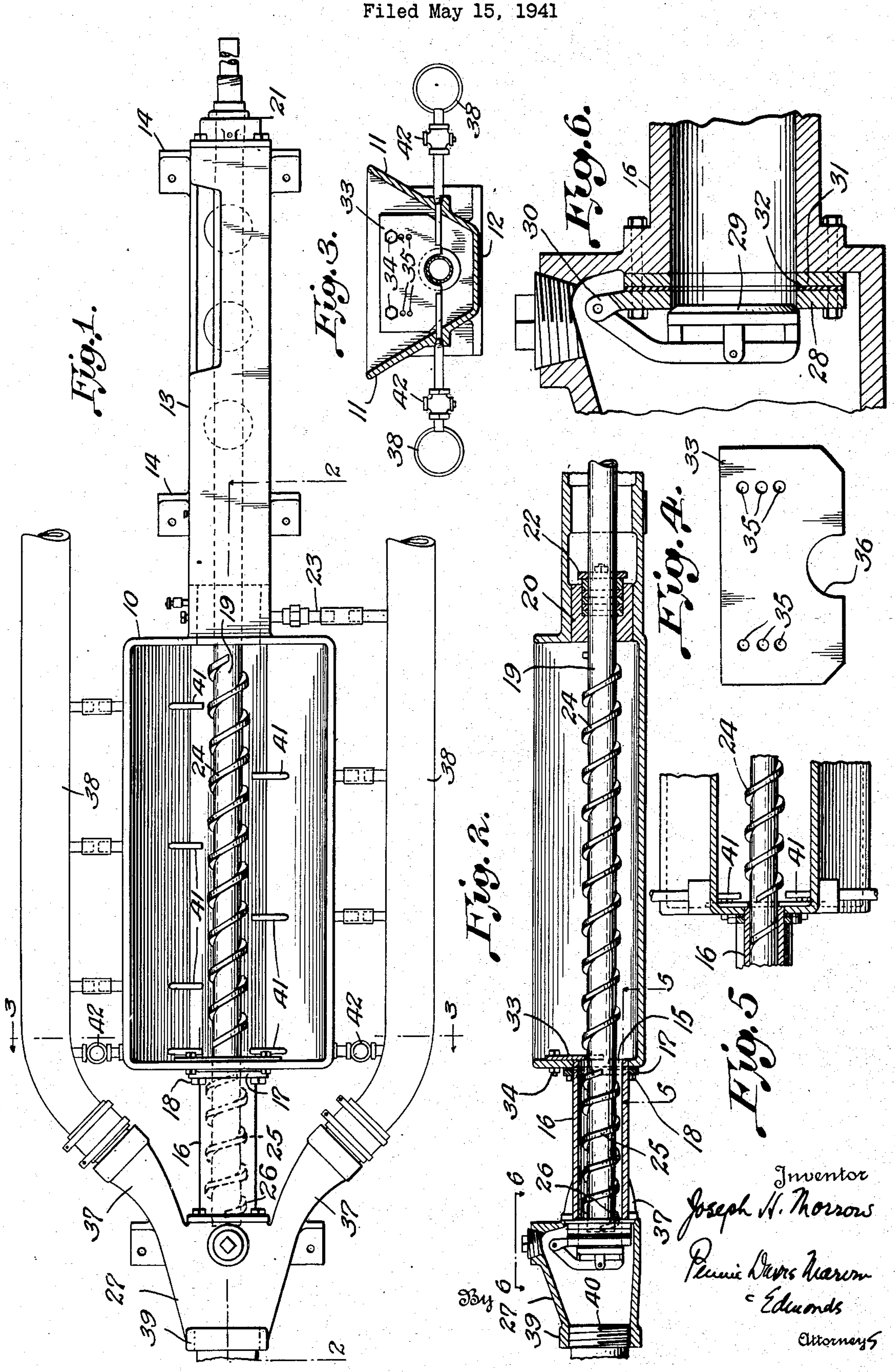

July 21, 1942. J. H. MORROW 2,290,809

DUST SPRAYING APPARATUS

Filed May 15, 1941

Inventor
Joseph H. Morrow

By Pennie Davis Marvin & Edmonds
Attorneys

Patented July 21, 1942

UNITED STATES PATENT OFFICE 2,290,809

DUST SPRAYING APPARATUS

Joseph H. Morrow, Hokendauqua, Pa., assignor to Fuller Company, Catasauqua, Pa., a corporation of Delaware Application May 15, 1941, Serial No. 393,681

6 Claims. (Cl. 302—50)

This invention relates to dust spraying or distributing apparatus in which the material to be sprayed is delivered from a supply hopper to an entraining air stream by power driven means. More particularly the invention relates to a novel apparatus of this type whereby a uniform predetermined quantity of dust may be sprayed or distributed at substantial velocity to surfaces remote from the dust supply hopper. An example of the use of the new apparatus is the spraying of such material as rock dust in mines, such as coal mines, to coat the deposits of fine coal dust in order to prevent explosions and it may also be employed to advantage in the spraying of insecticidal dust for the preservation of crops, etc.

The accumulation of fine combustible dust, such as coal dust, upon the walls, in crevices, and upon the floors of mines, presents a real source of danger to the miners in that this accumulated material, under certain conditions, is subject to spontaneous combustion, while under certain other conditions, such as draughts through the mine, a cloud of the fine material may be carried to an area where a spark from operating machinery will cause its explosion. To avoid the possibility of such explosions, it is the practice to coat all interior surfaces of the mine with a thin film of rock dust, which adheres to the surfaces because of the natural dampness present. Many of the tunnels, cracks, and crevices extending from the main mine passageways are too small to accommodate the passage of cars or other means which might be used to carry dusting equipment, and it is, therefore, necessary to discharge the dust from the dusting apparatus at a sufficient velocity to project the dust particles to the inaccessible surfaces. Where such surfaces are at great distances from the track tunnels where the equipment can be transported, sufficient air pressure is required to cause the entrained dust to flow through long hose lines to the desired point of application.

Heretofore, various forms of apparatus have been employed to spray or distribute dust for the purposes set forth, but the available equipment has not been wholly satisfactory. The efficiency of the prior equipment is excellent when it may be brought close to the surfaces to which the dust is to be applied, but it has been found, for example, in the spraying of the required surfaces in coal mines, that large portions of the surfaces requiring treatment are at points remote from the tunnels through which an apparatus may be moved.

The present invention is directed to the provision of an apparatus for spraying finely divided material, usually in dust form, which is superior to the prior apparatus in that the delivery of material is constant and plugging of the discharge line is avoided. The new apparatus is compact so that it can be mounted on a standard mine car and it is capable of delivering material to points from 100 to 500 feet distant.

While the apparatus of the invention may be employed for spraying various types of dust for many different purposes, it is especially advantageous when used in mines. An embodiment of the invention suitable for mine use will, accordingly, be illustrated and described in detail.

For a better understanding of the invention attention is directed to the accompanying drawing illustrating one form of the invention. In the drawing—

Figure 1 is a plan view of the improved apparatus.

Figures 2 and 3 are sectional views taken on lines 2—2, and 3—3, respectively of Fig. 1.

Figure 4 is an enlarged elevation of the discharge valve plate.

Figures 5 and 6 are sectional views taken on lines 5—5 and 6—6 of Figure 2, Figure 6 being enlarged to show certain details.

Referring to the drawing, the apparatus will be seen to comprise a hopper 10 having sloping side walls 11 and a bottom 12. A bearing housing 13 extends from the rear end wall of the hopper, near its bottom, and spaced along the length of the housing are rear supporting brackets 14 adapted to be fastened to a suitable support for the apparatus, such as a mine car or the like (not shown). The front end wall of the hopper is provided with an opening 15 through which the material passes to a barrel 16 secured in alignment with the opening 15 by collar 17 and bolts 18. The barrel 16 is positioned in axial alignment with the bearing housing 13, and a rotatable shaft 19, supported by a front bearing 20, which seals the hopper from the bearing housing, and a rear bearing 21, extends through the hopper and into the barrel 16 concentrically therewith. A shaft seal 22 in the bearing 20 is connected to a source of air supply by a short pipe 23 whereby a constant flow of air along the shaft in the direction of the hopper is maintained to prevent leakage of material into the bearing housing. The shaft may be driven in any suitable manner, as by an electric motor (not shown) having its rotor connected to the end of the shaft extending beyond the bearing 21.

That portion of the shaft 19 within the hopper carries screw flights 24 of uniform pitch and, upon rotation of the shaft, the flights advance material from the hopper through opening 15. The flights 24 terminate short of the opening 15 and a second series of screw flights 25 on that portion of the shaft within the barrel 16 cause the material to be advanced through the barrel to its discharge end. As more clearly shown in Figs. 1 and 2, this second series of screw flights is of slightly decreasing pitch in the direction of the terminal flight 26. The shaft and screw flights terminate short of the discharge end of the barrel to afford a seal space into which the material is compacted to resist the anticipated back pressure condition.

The barrel 16 terminates in an air mixing chamber 27 into which the material is discharged. A collar 28 having a center bore of the same internal diameter as the barrel is attached to the end of the barrel and forms its terminal or discharge end. A flap valve 29 pivotally carried by an extension 30 of the collar is adapted in its normally closed position to seal the barrel from the mixing chamber. Upon operation of the screw under such conditions that a full supply of material is discharged from the barrel, the valve is forced to its openmost position; at times when a partial supply of material issues from the conduit 16, or when the supply is erratic, the valve tends to return to its closed position, thus restricting the discharge opening and causing the material to accumulate in the seal space between the terminal flight of the screw and the valve to insure the proper seal under all conditions of material supply.

The seal space between the terminal flight of the screw and the outer end of collar 28 may be varied by insertion of one or more seal rings 31, 32 between the collar and the end of the barrel. Ordinarily the sealed space provided without using the rings is sufficient to permit operation over a wide range of pressures and the use of seal rings to extend the length of seal space is necessary only under extreme conditions.

The rate of discharge of the material from the hopper through the opening 15 is controlled by a vertically adjustable plate valve 33, secured to the inner face of the front end wall through which the material is discharged. The plate valve is fastened to the end wall in the desired position by readily removable means 34 extending through suitable holes in the wall and plate. The plate is provided with a vertical row of spaced holes 35 at each side whereby vertical adjustment of the plate may be accomplished to vary the area of the opening 15 through which the material may pass. A cut-out portion 36 in the bottom of the plate of a diameter slightly greater than the diameter of the shaft 19 permits the plate to be lowered over the shaft at the point between the two series of screw flights. When the opening 15 is partially closed by the valve plate, only a portion of the material moved forward by the flights 24 will pass therethrough, the remainder striking the plate and moving laterally in the hopper without substantial compression.

Streams of air under pressure are directed into the mixing chamber 27 by a pair of convergent nozzles 37 which are connected to a suitable source of positive air supply (not shown) by hoses 38. The turbulence resulting from the impinging air streams effects efficient mixing and entraining of the dust received in the chamber, and a uniform flow of entrained dust is maintained through the mixing chamber outlet 39. The outlet 39 is provided with threads 40 for the attachment of a hose line (not shown) of the desired length to direct the stream of entrained dust to the point of application, the pressure maintained within the system being sufficient to overcome the resistance of the hose line and cause discharge of the material at the end thereof with substantial force.

To assist in the control of the quantity of material passing into the barrel 16, and also to reduce the power required to rotate the shaft 19 to a minimum, the material supply in the hopper may be aerated. For this purpose, air nozzles 41 extending through the side walls of the hopper are provided. These nozzles are spaced longitudinally of the hopper and have discharge ends lying close to the screw flights 24. The nozzles are connected to the compressed air supply through pipes 38, and to control the flow of air in the nozzles nearest the opening 15, these nozzles are provided with valves 42, so that a delicate control of the aeration at this point is permitted. The control valves 42 shown are for regulation of the air flow through the nozzles 41 nearest the opening 15, but it will be obvious that such valves could be used to control the flow of air through all of the nozzles.

The operation of the apparatus is as follows: With the apparatus mounted upon a suitable carriage, the hopper is filled with a supply of dust material having the desired characteristics. The slide valve controlling the opening to the barrel is set at the desired position, and a source of compressed air is connected to the hopper jets and mixing chamber nozzles so that the material in the hopper adjacent the advancing screw is aerated and a substantial pressure is developed in the chamber. As there is no discharge of material from the barrel at this time, the pressure within the chamber causes the flap valve at the discharge end of the barrel to be tightly sealed and a reverse air blow through the barrel to the hopper is prevented. The air flowing into the material through the hopper jets immediately aerates the material in the lower portion of the hopper and the rotatable shaft may be connected to its source of power as soon as a steady flow of air is obtained. The aeration of the material in the hopper permits the use of a much lighter motor for driving this shaft, thus resulting in a saving in motor cost and power. Upon rotation of the shaft, the uniform pitch screw flights on that portion of the shaft within the hopper cause the material in the bottom of the hopper to be moved forward and enter the open end of the barrel where it is compressed somewhat by the screw flights on that portion of the shaft and is compacted in the seal space at the end of the barrel between the shaft end and the flap valve. As material continues to flow through the barrel, increase of material in the seal space gradually builds up a pressure against the valve sufficient to overcome the resistance offered by the weight of the valve and the back pressure, and the valve opens to discharge the material into the mixing chamber where it is mixed and entrained with the air and caused to flow to the point of application. During delivery of the dust, the rate of discharge may be varied at will by regulation of the flow of air through the hopper jets adjacent the point where the material enters the barrel, so that the dual control afforded by the slide valve and the valves controlling the hopper jets permits a wide variation in the discharge rate.

I claim:

1. An apparatus for spraying dust material which comprises the combination of a hopper to receive a supply of the dust material, a barrel communicating with the hopper through an opening in its front wall, a rotatable shaft extending through the hopper and into the barrel, the shaft terminating short of the discharge end of the barrel, a series of screw flights on that portion of the shaft within the hopper to advance the material to the barrel, said screw flights terminating short of the front wall of the hopper, a second series of screw flights on that portion of the shaft within the barrel to advance the material to its discharge end, said second series of screw flights having a decreasing pitch toward the terminal end of the shaft to cause the dust material advanced to be compacted adjacent the terminal flight, a mixing chamber communicating with the barrel to receive the discharged dust material, means for injecting compressed air into the chamber whereby the dust material is admixed and entrained in the air, means to direct the entrained material to desired points of application, aeration jets extending into the hopper and having their discharge ends adjacent the screw flights to direct compressed air into the material to reduce the density of the material advanced by the screw, and valve means to regulate the flow of air through the jets.

2. An apparatus for spraying dust material which comprises the combination of a hopper to receive a supply of the dust material, a barrel communicating with the hopper through an opening in its front wall, a rotatable shaft extending through the hopper and into the barrel, the shaft terminating short of the discharge end of the barrel, a series of screw flights on that portion of the shaft within the hopper to advance the material to the barrel, said screw flights terminating short of the front wall of the hopper, a second series of screw flights on that portion of the shaft within the barrel to advance the material to its discharge end, said second series of screw flights having a decreasing pitch toward the terminal end of the shaft to cause the dust material advanced to be compacted adjacent the terminal flight, a mixing chamber communicating with the barrel to receive the discharged dust material, means for injecting compressed air into the chamber whereby the dust material is admixed and entrained in the air, means to direct the entrained material to desired points of application, aeration jets extended into the hopper and having their discharge ends adjacent the screw flights near the communicating opening to the barrel, and valve means to regulate the flow of air from the jets, whereby the rate at which the material enters the barrel may be controlled.

3. An apparatus for spraying dust material which comprises the combination of a hopper to receive a supply of the dust material, a barrel communicating with the hopper through an opening in its front wall, a rotatable shaft extending through the hopper and into the barrel, the shaft terminating short of the discharge end of the barrel, a series of screw flights on that portion of the shaft within the hopper to advance the material to the barrel, said screw flights terminating short of the front wall of the hopper, a second series of screw flights on that portion of the shaft within the barrel to advance the material to its discharge end, said second series of screw flights having a decreasing pitch toward the terminal end of the shaft to cause the dust material advanced to be compacted adjacent the terminal flight, a mixing chamber communicating with the barrel to receive the discharged dust material, means for injecting compressed air into the chamber whereby the dust material is admixed and entrained in the air, means to direct the entrained material to desired points of application, aeration jets extending into the hopper and having their discharge ends adjacent the screw flights to direct compressed air into the material to reduce the density of the material advanced by the screw, valve means to regulate the flow of air through the jets, a slide valve removably carried by the hopper to restrict the opening to the barrel, and means to vary the position of the valve whereby the rate of flow of the material from the hopper into the barrel is further controlled.

4. An apparatus for spraying dust material which comprises the combination of a hopper having sloping side walls to receive a supply of the dust material, a bearing housing extending from the lower portion of the rear end wall of the hopper, a barrel communicating with the hopper through an opening in its front wall, the bearing housing and the barrel being in axial alignment, a rotatable shaft mounted in bearings in the housing and extending through the hopper and into the barrel, a series of screw flights of uniform pitch on that portion of the shaft within the hopper to advance the material toward the barrel, said screw flights terminating short of the front wall of the hopper, a second series of screw flights on that portion of the shaft within the barrel to advance the material to its discharge end, said second series of screw flights having a decreasing pitch toward the terminal end of the shaft to cause the dust material to be compacted adjacent the terminal flight, a mixing chamber integral with the terminal end of the barrel and communicating therewith to receve the discharged dust material, a collar secured to the end of the barrel and positioned within the mixing chamber, a flap valve normally sealing the discharge end of the barrel and pivotally carried by the collar, convergent nozzles communicating with the mixing chamber adjacent the discharge end of the barrel to direct streams of compressed air thereto whereby the dust material is admixed and entrained in the air, means connected to the mixing chamber to direct the entrained material therefrom to desired points of application, aeration jets extending into the hopper and having their discharge ends longitudinally spaced adjacent the screw flights to direct compressed air into the material to reduce the density of the material advanced by the screw, valve means to regulate the flow of air through the jets, a slide valve adjustably carried by the hopper to restrict the opening to the barrel, and means to vary the position of the valve whereby the rate of the material from the hopper is further controlled.

5. An apparatus for spraying dust material which comprises the combination of a hopper for holding a supply of the material, a barrel communicating with the hopper through an opening in the wall thereof, a rotatable shaft extending through the hopper and into the barrel, the shaft terminating short of the end of the barrel remote from the hopper, spaced series of screw flights on the shaft within the hopper and barrel, respectively, for advancing material from the hopper into and through the barrel, the series of flights within the barrel being of decreasing pitch toward the end of the shaft within the barrel, a mixing chamber into which material advanced through the barrel is discharged, means for introducing compressed air into the chamber for admixture with and entrainment of the material therein, means for directing the entrained material from the chamber to a selected delivery point, aeration jets entering the hopper to direct compressed air into the material therein to reduce its density, valve means for regulating the flow of air through the jets, and valve means for controlling the flow of material from the hopper into the barrel.

6. An apparatus for spraying dust material which comprises the combination of a hopper for holding a supply of the material, a barrel communicating with the hopper through an opening in the wall thereof, a rotatable shaft extending through the hopper and into the barrel, the shaft terminating short of the end of the barrel remote from the hopper, spaced series of screw flights on the shaft within the hopper and barrel, respectively, for advancing material from the hopper into and through the barrel, the series of flights within the barrel being of decreasing pitch toward the end of the shaft within the barrel, a mixing chamber into which material advanced through the barrel is discharged, means for introducing compressed air into the chamber for admixture with and entrainment of the material therein, means for directing the entrained material from the chamber to a selected delivery point, aeration jets entering the hopper to direct compressed air into the material therein to reduce its density, valve means for regulating the flow of air through the jets, valve means for controlling the flow of material from the hopper into the barrel, and a flap valve within the chamber at the end of the barrel tending to shut off communication between the chamber and barrel.

JOSEPH H. MORROW.